Patented Oct. 6, 1931

1,825,814

UNITED STATES PATENT OFFICE

JAMES F. NORRIS, OF BOSTON, MASSACHUSETTS, ASSIGNOR, BY MESNE ASSIGNMENTS, TO PETROLEUM CHEMICAL CORPORATION, OF NEW YORK, N. Y., A CORPORATION OF DELAWARE

PURIFICATION OF SYNTHETIC OR SUBSTITUTION PRODUCTS SUCH AS ALKYL HALIDES

No Drawing.   Application filed October 29, 1923.   Serial No. 671,387.

This invention relates to the purification of alkyl halides.

In the preparation of alkyl halides, whether by synthesis or substitution, there are commonly present residual amounts of foreign materials, such as the reagents present during preparation or entering into these compounds, or other impurities incidental to them, or to the process employed. These foreign materials (for example, alcohols, esters, unsaturated compounds, water and the like) may have boiling points very close to that of the halide desired. Such a condition may occur in synthetic or substitution products obtained by different modes of forming such products. In some cases, it is exceedingly difficult to effect a satisfactory separation of the product from its attendant impurities. Conversions into more distinct and separable compounds may of course be resorted to, but such practices are tedious and involve considerable loss.

I have discovered that alkyl halides may be separated from impurities, and at the same time remain substantially unaffected themselves by adding to the impure mixture in which the halide is contained a quantity of a non-volatile mineral acid such as concentrated sulfuric acid, subjecting the mixture to heat, and separating the halide from the resulting acid liquor.

The invention will now be described, for a typical instance only, in connection with its application to the purification of isopropyl chloride, which may contain as impurities, for example, such foreign bodies as alcohols and other organic compounds derived from petroleum, or mixtures of such compounds, and metallic compounds, such as halides; water, and other substances.

To the product in this condition is added a suitable proportion, recommended to be an equal volume, of a suitable concentrated acid; the aggregate is thoroughly mixed and subjected to heating. Concentrated sulfuric acid of commercial grade having a specific gravity of about 1.84 is a satisfactory acidulant, which may be added at the desired temperature.

The mixture may now be allowed to digest for any desired or necessary time at temperatures higher than normal atmospheric temperatures without affecting the halide or the ultimate yield obtained; but prolonged digesting is not necessary to performance of the process, a combining reaction of the hot acidulant with the impurities taking place speedily in all usual cases. Preferred acids form an aggregate fluid with which the halide is not miscible, and in which it is not soluble. The material may now be cooled and decanted, or otherwise treated to separate the halide from the remainder. For example, the aggregate fluid is heated without previous cooling to a sufficient temperature to distill off the halide, which may be effected by the usual distillation procedure, and may include cooling the escaping gases and vapors sufficiently to liquefy the halide.

In the case of the treatment of an aggregate containing isopropyl chloride, the fraction of the distillate (which may be substantially all of the distillate) collected at the temperature corresponding to the liquefaction conditions for isopropyl chloride (boiling point 36° C.) will be found to be in an essentially pure and anhydrous condition. The sulfuric acid will remain in the distillation vessel together with numerous impurities which may be present such as alcohol, water, and organic compounds. Whether such impurities chemically combine with the sulfuric acid or are mechanically or physically retained in the distillation chamber is not material to the effect of the process, and the nature of the residuum will of course depend upon the chemical constitution and physical properties of the particular impurities. Mechanical retention, physical solution and chemical combination of the impurities undoubtedly all occur, with combined effect to hold back a large variety of compounds which might otherwise distil over. The process may be considerably varied as to the precise distillation procedure and obviously may be applied to other cognate compounds not reactive with the acidulant, such as sulfuric acid, depended upon to retain impurities having boiling-points too close to the desired distillate to be effectively separated by ordinary fractional distillation.

I claim:

1. A process for the purification of an impure liquid alkyl halide which comprises adding a non-volatile liquid mineral acid thereto, raising the temperature of the resulting mixture, and separating the purified alkyl halide from the remaining mixture.

2. A process for the purification of a liquid alkyl halide containing impurities which comprises adding a non-volatile liquid mineral acid thereto, heating the resulting mixture to a temperature at which said alkyl halide will distill from the resulting liquid mixture, distilling the said alkyl halide and collecting the purified alkyl halide.

3. A process for the purification of an impure liquid alkyl halide which comprises adding sulphuric acid thereto, heating the resulting mixture and distilling the mixture to separate the alkyl halide from said resulting mixture.

4. A process for the purification of an alkyl halide comprising mixing the same in impure condition with an equal volume of concentrated sulfuric acid and subjecting the mixture to distillation.

5. A process for the purification of an alkyl halide comprising mixing the same in impure condition with an appropriate volume of concentrated sulfuric acid, digesting the acidulated mixture, and subjecting the mixture to distillation.

6. A process for the purification of alkyl halides in an impure state in an aggregate fluid comprising acidulating the fluid with an acid with which the halide is not readily miscible, raising the temperature to cause reaction of the acid with the impurities and separating the pure halide and the acidulated remainder.

Signed by me at Cambridge, Massachusetts, this twenty fourth day of September 1923.

JAMES F. NORRIS.